(12) United States Patent
Sobelman et al.

(10) Patent No.: US 8,842,513 B2
(45) Date of Patent: Sep. 23, 2014

(54) METHOD OF DATA MODULATION AND DEMODULATION IN SOC

(75) Inventors: Gerald E. Sobelman, Minneapolis, MN (US); Dae-wook Kim, Seoul (KR); Man-ho Kim, Seoul (KR); Beam-hak Lee, Seoul (KR); Eui-seok Kim, Suwon-si (KR); Sang-woo Rhim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 831 days.

(21) Appl. No.: 12/882,969

(22) Filed: Sep. 15, 2010

(65) Prior Publication Data

US 2011/0069770 A1   Mar. 24, 2011

Related U.S. Application Data

(63) Continuation of application No. 11/289,544, filed on Nov. 30, 2005, now abandoned.

(30) Foreign Application Priority Data

Nov. 30, 2004   (KR) .................................. 2004-99281

(51) Int. Cl.
*H04J 11/00* (2006.01)
*H04B 1/707* (2011.01)

(52) U.S. Cl.
CPC ........................................ *H04B 1/707* (2013.01)
USPC ............ 370/208; 370/389; 370/335; 370/204

(58) Field of Classification Search
USPC .......... 370/354, 466, 209, 335, 389, 304, 208
See application file for complete search history.

(56) References Cited

U.S. PATENT DOCUMENTS 5,204,874 A * 4/1993 Falconer et al. .............. 375/130
5,533,013 A   7/1996 Leppanen (Continued)

FOREIGN PATENT DOCUMENTS

EP   1237292 A2   9/2002

OTHER PUBLICATIONS

Mau-Chung et al. ("Advanced RF/Baseband Interconnect Schemes for Inter and Intra-ULSI Communications");Jul. 2005; IEEE vol. 52; pp. 1271-1285.*

(Continued)

*Primary Examiner* — Ricky Ngo
*Assistant Examiner* — Dewanda Samuel
(74) *Attorney, Agent, or Firm* — Muir Patent Consulting, PLLC

(57) ABSTRACT

A method of modulating data, which is represented by two data types of 'high' and 'low', and demodulating the modulated data, is disclosed. In a method of data modulation and demodulation for a communication system which has a transmitting end modulating a data and a receiving end demodulating the transmitted data from the transmitting end, the data is represented by two types including 'high' and 'low', and the receiving end receives at least one data which consists of at least one code-word spread by a unique orthogonal code. The receiving end adds up the received data in the unit of code-word, and subtracts the length of the orthogonal code from a value which is obtained by doubling the sum of the code-word, when the code-word of the orthogonal code is '0'. The receiving end then averages the result after the subtraction in the unit of orthogonal code length and extracts the result, and therefore, obtains the data from the transmitting end.

7 Claims, 5 Drawing Sheets

(56) References Cited

U.S. PATENT DOCUMENTS

| | | | |
|---|---|---|---|
| 5,585,745 A * | 12/1996 | Simmons et al. | 326/93 |
| 5,615,209 A * | 3/1997 | Bottomley | 370/342 |
| 5,784,293 A * | 7/1998 | Lipa | 708/410 |
| 5,894,592 A * | 4/1999 | Brueske et al. | 455/86 |
| 6,130,884 A | 10/2000 | Sato | |
| 6,700,881 B1 | 3/2004 | Kong et al. | |
| 6,707,788 B1 * | 3/2004 | Kim et al. | 370/203 |
| 6,975,669 B2 | 12/2005 | Ling et al. | |
| 6,976,108 B2 | 12/2005 | Kim | |
| 7,016,695 B1 * | 3/2006 | Bahai | 455/466 |
| 7,139,305 B2 | 11/2006 | Gavnoudias et al. | |
| 7,307,331 B2 * | 12/2007 | Kipnis et al. | 257/499 |
| 7,356,633 B2 | 4/2008 | Weber et al. | |
| 2002/0031166 A1 * | 3/2002 | Subramanian et al. | 375/130 |
| 2002/0138678 A1 | 9/2002 | Kim et al. | |
| 2003/0062922 A1 * | 4/2003 | Douglass et al. | 326/39 |
| 2006/0095626 A1 | 5/2006 | Tsay et al. | |

OTHER PUBLICATIONS

Lai et al; ("CT-BuS: A Heterogeneous CDMA/TDMA Bus for Future SOC"); 2004; IEEE; pp. 1868-1872.

* cited by examiner

METHOD OF DATA MODULATION AND DEMODULATION IN SOC

CROSS-REFERENCE TO RELATED APPLICATIONS

This application claims the benefit of priority to and is a Continuation of U.S. patent application Ser. No. 11/289,544, filed Nov. 30, 2005, now abandoned which claims the benefit of Korean Patent Application No. 2004-99281, filed on Nov. 30, 2004, in the Korean Intellectual Property Office, the disclosure of each of which is incorporated herein by reference.

BACKGROUND OF THE INVENTION

1. Field of the Invention

The present invention relates to a method of modulating transmission data and demodulating received data. More particularly, the present invention relates to a method of modulating and demodulating data represented in two types, that is, high and low.

2. Description of the Related Art

Generally, a transmitting end of a communication system, which sends out signal to a receiving end, carries out certain predetermined processes to reduce error of signal transmission. Therefore, the transmitting end carries out modulation with respect to the transmission data, and the receiving end carriers out demodulating processes with respect to the received data to recover to the initial data.

FIG. 1 shows a general data (signal) transmission in a conventional communication system, and FIGS. 2A to 2H show the waveforms of the signal being processes in the transmitting and receiving nodes of the communication system. As follows, the process of modulating and demodulating data in a general communication system will be described in detail with reference to FIG. 1, and FIGS. 2A to 2H.

In FIG. 1, a communication system includes a transmitting node A, a transmitting node B, and a receiving node C. Other elements may be included in the communication system. However, FIG. 1 only shows the above-mentioned elements for easier understanding.

The transmitting node A generates data (a) to transmit to the receiving node C. The transmitting node B generates data (b) to transmit to a node other than the receiving node C.

When the data to transmit is '1', the data is expressed as '−1', and when the data for transmission is '0', it is expressed as '1'. As illustrated in FIG. 2A, the data (a) is '101', and according to FIG. 2C, the data (b) is '110'.

The transmitting node carries out modulation with respect to the data for transmission. Accordingly, the transmitting node spreads data for transmission by using orthogonal codes. By the orthogonal code expansion, error rate of the data in the transmission channel can be reduced, The transmitting node spreads the transmission data by using the orthogonal code as allocated to the receiving node. The orthogonal code may include Walsh code.

Accordingly, the transmitting node A spreads transmission data by using the orthogonal code which is allocated to the receiving node C. In FIG. 1, the receiving node C is allocated with the orthogonal code 'w0'. With reference to FIG. 2B, the code 'w0' is '0101', and through data expansion as illustrated in FIG. 2E, the code 'w0' is spread to '1010 0101 1010'. The transmitting node A sends out the spread data over the antenna.

The transmitting node B spreads transmission data by using the orthogonal code which is allocated to the receiving node. With reference to FIG. 1, the orthogonal code 'w1' is allocated to the receiving node. With reference to FIG. 2D, the code 'w1' is '0011', and through the data expansion as shown in FIG. 2F, the code 'w1' is spread to '1100 1100 0011'. The transmitting node B sends out expansion data over the antenna.

The receiving node C receives the spread data from the transmitting node A and from the transmitting node B. Accordingly, the receiving node C needs to extract data which is transmitted from the transmitting node A. The process by the receiving node C of extracting the data of the transmitting node A, will now be described below.

FIG. 2G shows the data received at the receiving node C. With reference to FIG. 2G, the receiving node C receives summation data of the data of the transmitting node A and the transmitting node B. For the convenience of explanation, the receiving node C therefore receives data of '−2 0 0 2 0 −2 2 0 0 2 −2 0'.

The receiving node C reverse-spreads the received data with the orthogonal code it is allocated. More specifically, the receiving node has allocated with the orthogonal code of '0101', which is converted to '1 −1 1 −1' for use in the modulation and demodulation process. Therefore, the receiving node reverse-spreads the received data '−2 0 0 2 0 −2 2 0 0 2 −2 0' by using '1 −1 1 −1'.

With reference to FIG. 2H, the receiving node C obtains '−2 0 0 −2 0 2 2 0 0 −2 −2 0' by carrying out the reverse-expansion.

The receiving node C segments the obtained data in the unit of orthogonal code length, and averages the segmented data. More specifically, the receiving code C obtains an average '−1' with respect to '−2 0 0 −2', obtains an average '1' with respect to '0 2 2 0', and obtains an average '−1' with respect to '0 −2 −2 0'. As the receiving node C obtains '−1 1 −1', the transmitting node A can obtains transmission data '101'.

However, because the transmission data is expressed in three types, that is, '−1', '0 (no data)', '1', the data range for reception at the receiving nodes increases as the number of transmitting nodes increases. In other words, when there are five transmitting nodes, the receiving node needs to receive data of '−5' to '5'. Accordingly, bits increase to receive the data, and subsequently load also increases to process the increased data.

Furthermore, the above-explained method is not suitable for a communication system which transmits data in two types, that is, high and low. Accordingly, a method of data modulation and demodulation, which can be used in a communication system that expresses data in high and low type, is required.

SUMMARY OF THE INVENTION

Accordingly, it is an aspect of the present invention to provide a data modulation and demodulation method which can be used in a communication system transmitting data in two types, that is, 'high' and 'low' data types.

Another aspect of the present invention is to provide a method for reducing required load for reception data demodulation, by providing a communication system which transmits data in two data types, that is, 'high' and 'low' types.

The foregoing and/or other aspects of the present invention are achieved by providing a method of data modulation and demodulation for a communication system which has a transmitting end modulating a data and a receiving end demodulating the transmitted data from the transmitting end, the data being represented by two types including 'high' and 'low', and the method of data modulation and demodulation including receiving at least one data which comprises at least one code-word spread by a unique orthogonal code, and adding up the received data in the unit of code-word, subtracting the length of the orthogonal code from a value which is obtained by doubling the sum of the code-word, when the code-word of the orthogonal code is '0', and averaging the result after the subtraction in the unit of orthogonal code length and extracting the result.

Additionally, the value, which is obtained by doubling the sum of the code-word, is subtracted from the length of the orthogonal code, when the code-word of the orthogonal code is '1'. The communication system may be a system-on-chip (SoC).

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
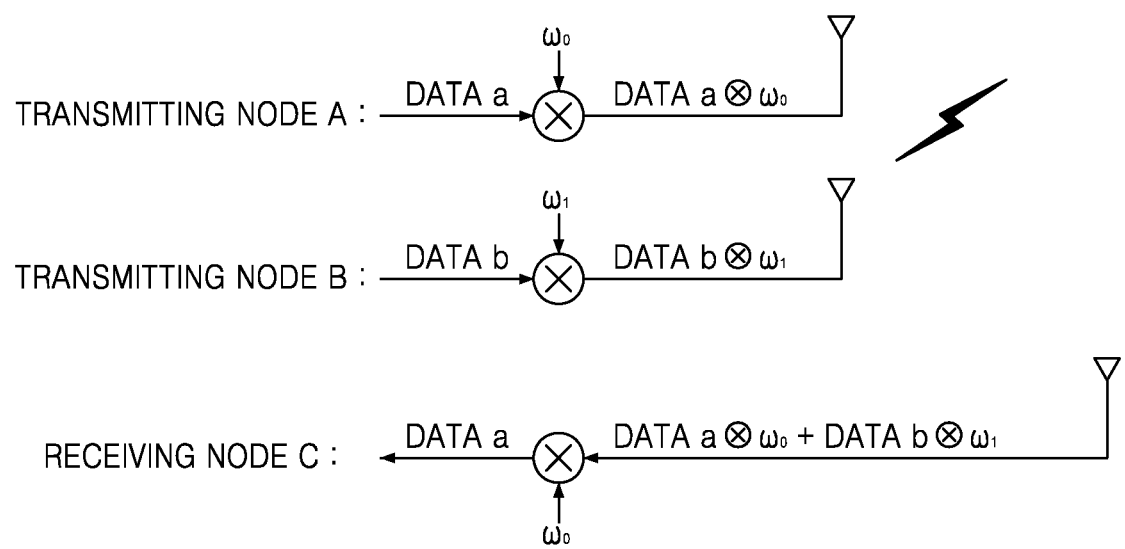
FIG. 1 is a view illustrating a conventional communication system modulating and demodulating data.
Figure 2:
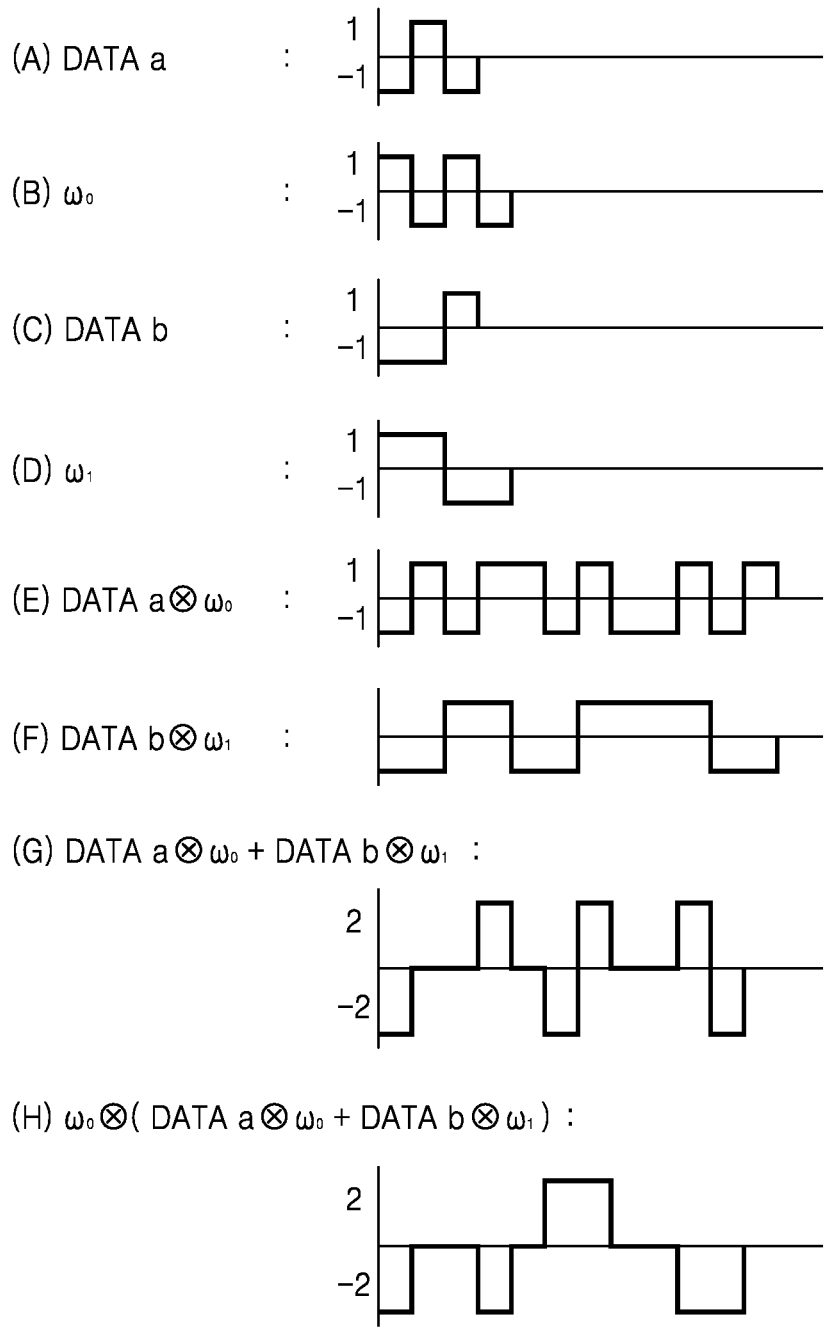
FIG. 2 is a view illustrating conventional waveforms of signals being processed in respective steps of the communication system of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

First, a SoC using modulation and demodulation according to the present invention will be described.

Digital information devices such as mobile phones, personal digital assistants (PDA), digital TVs, smart phones, require various semiconductor chips such as microprocessor, network chip and memory, in order to achieve efficient Internet access or computing. As the information devices get more complex and varied, incorporation of different information devices is expected to accelerate, and more chips will be subsequently needed in a single information device.

System on a chip, or SoC, is a technology suggested to incorporate not only semiconductor chips, but also all the separate components in a single chip by integrating various components in one chip. The SoC usually includes computational element, I/O, logic, and memory. Being compact and highly integrated, SoC of high performance and low power consumption is expected to be applied to a wide range of information communication devices. An intellectual property (IP) is used for efficient design of semiconductor chips. IPs refer to design blocks which are developed for application in corresponding chips.

Many studies are seeking for the techniques to realize the SoC, and especially, an efficient way of connecting several IPs of the chip, is one of the most important matters. Currently, using a bus structure and a network structure are available as a way to connect IPs. Using the bus structure almost reached a limit due to the increase of data volume transmitted between IPs, because a bus cannot be used by other IPs if any one of IPs is using the bus. In other words, one IP exclusively uses the bus.

Furthermore, the bus structure does not sufficiently support for the expansion characteristic. Due to the fixed characteristic of the bus structure, expansion of IPs in the chip is not supported. Using the network structure has been suggested in an attempt to overcome the shortcoming of the way of using bus structure. The network structure has a less power consumption than the bus structure.

Figure 3:
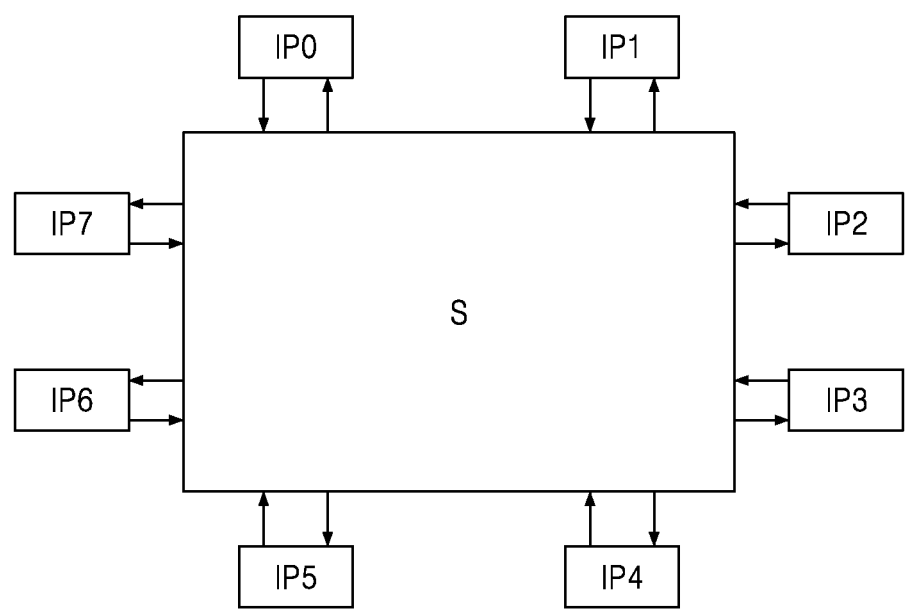
FIG. 3 is a view illustrating a conventional structure of a SoC.

FIG. 3 illustrates a SoC which transmits data to the neighboring IPs. In FIG. 3, a star topology is illustrated in which at least two IPs share one switch. More specifically, FIG. 3 illustrates eight IPs that share one switch. The eight IPs include IP(0) to IP(7). Each IP is allocated a unique orthogonal code. Allocation of orthogonal code to each IP will be described below.

It is assumed that data is generated for IP(0) to send to IP(3), and another data is generated for IP(6) to send to IP(7). The IP(0) spreads generated data by using the orthogonal code allocated to IP(3). The IP(0) transmits the spread data to the switch. The IP(6) spreads the generated data by using the orthogonal code allocated to the IP(7). The IP(6) transmits the spread data to the switch. The switch adds up the received data and broadcast to the neighboring connected IPs. In other words, the switch transmits the sum of received data to IP(0) through IP(7).

The IP(0) through IP(7) de-spreads the received data by using the allocated orthogonal code. By the de-spreading, the IP(3) receives the data from the IP(0), and the IP(7) receives the data from the IP(6).

The process of the transmitting IP transmitting data will now be described with reference to FIG. 4. As mentioned above, an IP of a SoC transmits data in two representation, that is, transmits data in high and low data types. For the convenience of explanation, the high data will be expressed as '1', and the low data will be expressed as '0'.

At operation 400, the transmitting IP stores an orthogonal code in length L, which is allocated to the IPs of a SoC. When it is assumed that seven IPs constitute the SoC, the following table 1 lists orthogonal codes which are 8 in length, respectively, and allocated to the respective IPs of the SoC:

TABLE 1

| IP | Allocated orthogonal code |
|---|---|
| IP(0) | 0101 0101(w1) |
| IP(1) | 0011 0011(w2) |
| IP(2) | 0110 1001(w3) |
| IP(3) | 0000 1111(w4) |
| IP(4) | 0101 1010(w5) |
| IP(5) | 0011 1100(w6) |
| IP(6) | 0110 1001(w7) |

In this embodiment, 'w0' is not allocated to the IPs, but used when there is no data.

At operation 402, the transmitting IP generates data, and spreads the generated data at operation 404, by using the orthogonal code which is allocated to the destination IP. The transmitting IP transmits the spread data to the switch at operation 406.

Figure 5:
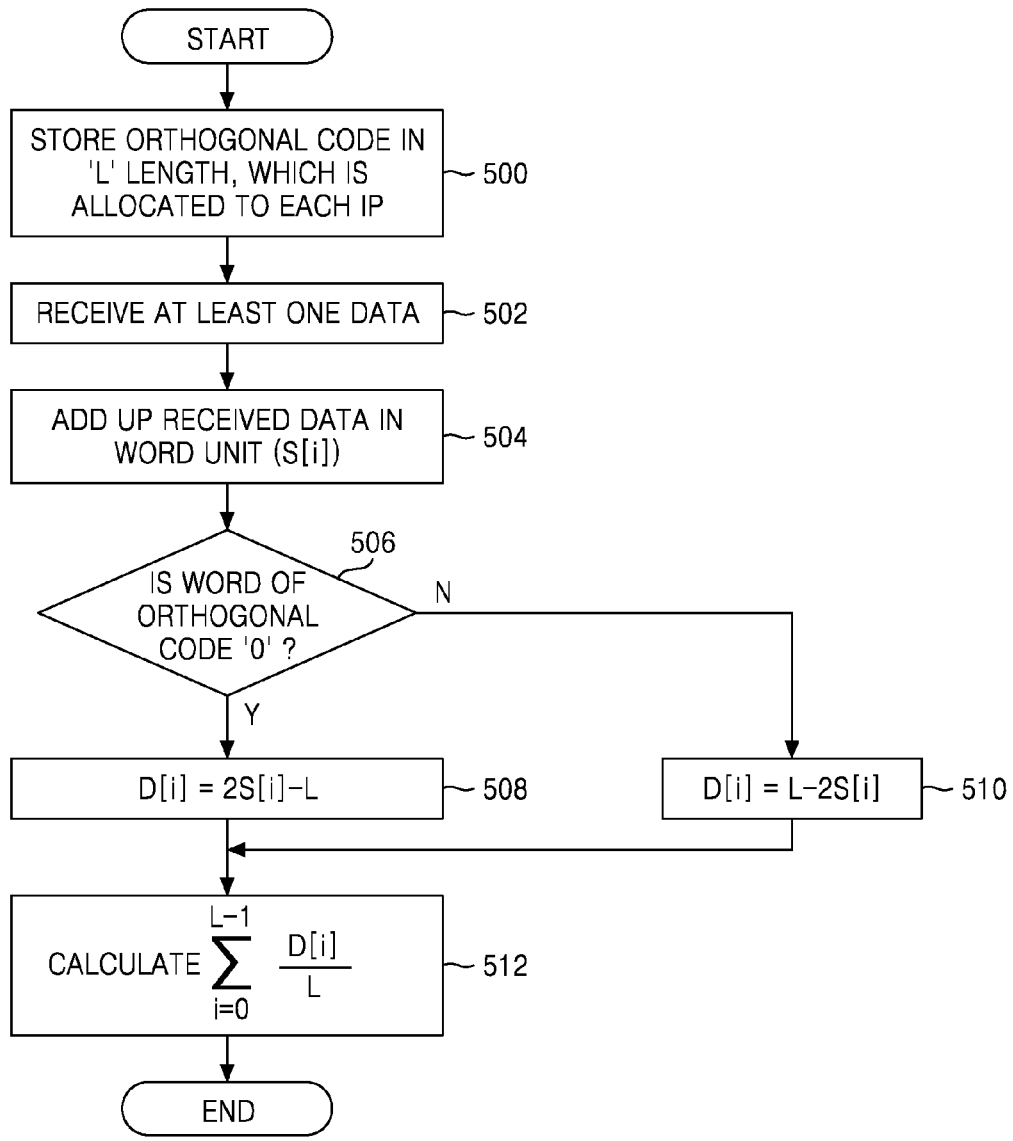
FIG. 5 is a view illustrating the operation of a receiving IP according to an embodiment of the present invention.

FIG. 5 illustrates the operations of a receiving IP. The operations of the receiving IP according to an embodiment of the present invention will now be described with reference to FIG. 5.

At operation 500, the receiving IP stores orthogonal codes in length 'L' to the respective IPs. The orthogonal code stored at the receiving IP at operation 500 is identical to the orthogonal code stored at the transmitting IP at operation 400.

At operation 502, the receiving IP receives at least one data. In other words, when there are two transmitting IPs, the receiving IP receives two data. At operation 504, the receiving IP adds up the received data to code-word unit (word-wise unit) and obtains S[i]. The code-word unit will be explained below.

At operation 506, the receiving IP determines whether the code-word of the orthogonal code is '0' or not. If the code-word of the orthogonal code is '0', the operation continues to operation 508, while if it is '1' the operation moves to operation 510.

At operation 508, the receiving IP doubles the sum of operation 504 and subtracts the length of the orthogonal code (2S[i]−L). At operation S510, the receiving IP subtracts the doubled value of the summed result of operation 504 from the length of the orthogonal code (L−2S[i]).

At operation 512, the receiving IP averages the data of operation 508 or operation 510, and subsequently obtains the data from the transmitting IP. The operation of the receiving IP, which is illustrated in FIG. 5, can be performed at an output port of the switch.

The characteristics and aspects of the present invention will be described mainly with reference to one exemplary embodiment of the present invention.

It is assumed that the IP(1) intends to send data '10' to the IP(2). It is also assumed that the IP(3) intends to send the data '11' to the IP(4). In order to transmit the data '10', the IP(1) spreads the data '10' by using the orthogonal code allocated to the IP(2). The orthogonal code allocated to the IP(2) is '0110 1001'. Accordingly, the IP(1) generates spread data of '1001 0110 0110 10001'. In order to transmits the data '11', the IP(3) spreads the data '11' by using the orthogonal code allocated to the IP(4). The IP(4) is allocated with the orthogonal code of '0101 1010'. Therefore, the IP(3) generates spread data of '1010 0101 1010 0101'. The IP(1) and the IP(3) transmit the generated data to the switch. The above operations can be carried out at the input port of the switch, instead of the IP(1) and IP(3).

The IP(2) and the IP(4) respectively add up the data from the IP(1) and the IP(3) in the unit of code-word, and receive the data. In other words, the IP(2) and the IP(4) receive data S[i] of '2011 0211 1120 1102' (i=code word). The IP(2) and the IP(4) double the received S[i] to, '4022 0422 2240 2204'.

The IP(2) and the IP(4) perform operation 508 when the code-word of the allocated orthogonal code is '0', and perform operation 510 when the code-word of the allocated orthogonal code is '1'.

The following table 2 lists the operations of the IP(2), and the following table 3 lists the operations of IP(4).

TABLE 2

| 2S[i] | 4 0 2 2 0 4 2 2 | 2 2 4 0 2 2 0 4 |
|---|---|---|
| L | 8 8 8 8 8 8 8 8 | 8 8 8 8 8 8 8 8 |
| Allocated orthogonal code | 0 1 1 0 1 0 0 1 | 0 1 1 0 1 0 0 1 |
| D[i] | −4 8 6 −6 8 −4 −6 6 | −6 6 4 −8 −6 6 −8 4 |

TABLE 3

| 2S[i] | 4 0 2 2 0 4 2 2 | 2 2 4 0 2 2 0 4 |
|---|---|---|
| L | 8 8 8 8 8 8 8 8 | 8 8 8 8 8 8 8 8 |
| Allocated orthogonal code | 0 1 0 1 1 0 1 0 | 0 1 0 1 1 0 1 0 |
| D[i] | −4 8 −6 6 8 −4 6 −6 | −6 6 −4 8 −6 6 8 −4 |

The IP(2) adds up the D[i] of Table 2 in the unit of orthogonal code length and averages the result. In other words, the IP(2) obtains an average '1' of '−4 8 6 −6 8 −4 −6 6', and obtains an average '−1' of '−6 6 4 −8 −6 6 −8 4'. Based on the assumption that the transmission data is '1' when the average is '1', and the transmission data is '0' when the average is '−1', the IP(2) can obtain '10' transmitted from the IP(1).

The IP(4) adds up the D[i] of Table 3 in the unit of orthogonal code length and averages the result. In other words, the IP(4) obtains an average '1' of '−4 8 −6 6 8 −4 6 −6', and obtains an average '−1' of '−6 6 −4 8 −6 6 8 −4'. Based on the assumption that the transmission data is '1' when the average is '1', and the transmission data is '0' when the average is '−1', the IP(4) can obtain '11' transmitted from the IP(3).

The above examples shows transmission of only two IPs. However, the present invention is equally applicable to a case where all of the IPs of the SoC transmit data. Of course, the length of the allocated orthogonal codes increases as the number of IPs of the SoC increases.

Figure 4:
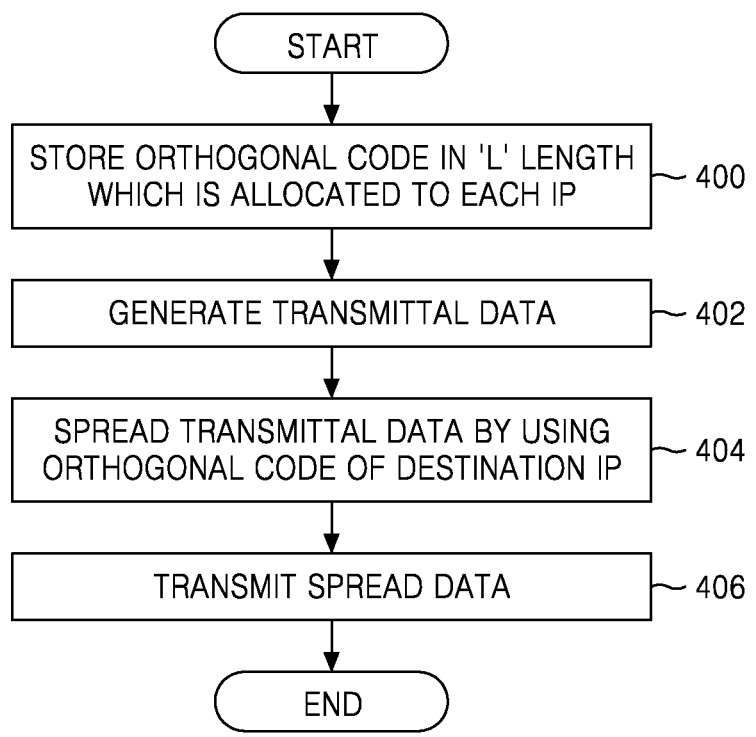
FIG. 4 is a view illustrating the operation of a transmitting IP according to an embodiment of the present invention.

Although FIGS. 3 to 5 shows the operations at IPs and the switch of SoC, it should not be construed as limiting. In other words, any system that can transmit and receive data in 'high' and 'low' data types may equally utilize the technical idea of the present invention in transmitting and receiving data.

As described above in a few exemplary embodiments of the present invention, a system transmits and receives data in two data types, that is, 'high' and 'low', in modulating and demodulating the data. Compared to a conventional system, which modulates and demodulates data in three data representation types, a smaller range of reception is provided to a receiving end and therefore, load to the receiving end reduces. More specifically, in a system which has five transmitting nodes, and modulates and demodulates data in three representation types, a receiving node needs to express '−5' to '5'. On the contrary, in the system employing the present invention, a receiving node is only required to express '0' to '5'.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A communication system comprising:
a System-on-Chip (SoC) comprising a first intellectual property (IP) and a second IP, the first intellectual property (IP) configured to modulate a data and the second IP configured to demodulate the modulated data received from the first IP; and
a plurality of transmitting nodes including a first transmitting node of the first IP, a plurality of receiving nodes, including a second transmitting node of the second IP, and a communication structure providing a communication link between the transmitting nodes and the receiving nodes,
wherein the data consists of '1' and '0' before being spread by an orthogonal code, wherein each transmitting node is configured to spread data by a corresponding one of a plurality of orthogonal codes and to provide the spread data to the communication link, wherein each receiving node is configured to receive spread data from a transmitting node via the communication link and despread the spread data using a corresponding one of the plurality of orthogonal codes, wherein the plurality of transmitting nodes includes a first transmitting node and the plurality of receiving nodes includes a first receiving node, and wherein the first receiving node is configured to obtain data of the first transmitting node when an orthogonal code used by the first receiving node to despread the data is the same as the orthogonal code used by the first transmitting node to spread the data.

2. The system of claim 1, wherein each receiving node is assigned an orthogonal code unique to the corresponding receiving node, each receiving node configured to despread the received spread data using the corresponding assigned orthogonal code, and wherein to transmit data to a selected receiving node, each transmitting node is configured to select the orthogonal code assigned to the selected receiving node and use the selected orthogonal code to spread the data to be transmitted to the selected receiving node.

3. The system of claim 2, wherein the semiconductor chip includes a plurality of intellectual properties including the first IP and the second IP, wherein each IP includes a receiving node and a transmitting node.

4. The system of claim 2, wherein the plurality of transmitting nodes include a first transmitting node and a second transmitting node, wherein the communication structure comprises a switch and wherein the switch is configured to add spread data received from the first transmitting node and spread data received from the second transmitting node to generated a sum of spread data and broadcast the sum of spread data to the receiving nodes.

5. The system of claim 4, wherein the each receiving node is configured to despread the received data by despreading the sum of spread data.

6. The system of claim 2, wherein each transmitting node is configured to select an orthogonal code which is not assigned to any of the receiving nodes when the transmitting node has no data to transmit to a receiving node.

7. The system of claim 1, wherein the spread data provided by each of the transmitting nodes is a code word, each digit of the code word being a binary bit represented by a '0' or a '1'.

* * * * *